United States Patent
Greenlee et al.

(10) Patent No.: US 7,870,192 B2
(45) Date of Patent: Jan. 11, 2011

(54) INTEGRATED VOICE AND VIDEO CONFERENCING MANAGEMENT

(75) Inventors: Gordan G. Greenlee, Endicott, NY (US); James A. Martin, Jr., Endicott, NY (US); Renee Christine Mullins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 11/014,391

(22) Filed: Dec. 16, 2004

(65) Prior Publication Data

US 2006/0147009 A1  Jul. 6, 2006

(51) Int. Cl.
*G06F 15/16* (2006.01)

(52) U.S. Cl. .............. 709/204; 709/217; 709/226; 709/227; 370/260; 370/261; 370/262; 370/263; 370/264; 379/204.01; 379/205.01; 379/203.01; 715/751; 715/753

(58) Field of Classification Search .............. 709/204, 709/217, 226–227
See application file for complete search history.

(56) References Cited

U.S. PATENT DOCUMENTS

| | | | | |
|---|---|---|---|---|
| 4,653,090 A * | 3/1987 | Hayden | ............... | 379/204.01 |
| 4,796,293 A * | 1/1989 | Blinken et al. | ......... | 379/202.01 |
| 4,920,565 A * | 4/1990 | Strawczynski et al. | ...... | 380/257 |
| 5,426,510 A * | 6/1995 | Meredith | .................... | 386/107 |
| 5,594,859 A * | 1/1997 | Palmer et al. | ............... | 715/756 |
| 5,596,635 A * | 1/1997 | Rao | ..................... | 379/202.01 |
| 5,604,738 A * | 2/1997 | Shibata et al. | .............. | 370/264 |
| 5,608,653 A * | 3/1997 | Palmer et al. | ............... | 709/204 |
| 5,619,555 A * | 4/1997 | Fenton et al. | ............. | 379/88.11 |
| 5,657,246 A * | 8/1997 | Hogan et al. | ............... | 348/14.1 |
| 5,802,294 A * | 9/1998 | Ludwig et al. | .............. | 709/204 |
| 5,925,101 A * | 7/1999 | Bayless et al. | ............. | 709/219 |
| 5,938,723 A * | 8/1999 | Hales et al. | ................. | 709/204 |
| 6,069,943 A * | 5/2000 | David et al. | ............ | 379/202.01 |
| 6,125,398 A * | 9/2000 | Mirashrafi et al. | .......... | 709/236 |
| 6,195,683 B1 * | 2/2001 | Palmer et al. | ............... | 709/204 |
| 6,201,859 B1 * | 3/2001 | Memhard et al. | ........ | 379/93.21 |
| 6,237,025 B1 * | 5/2001 | Ludwig et al. | .............. | 709/204 |
| 6,266,341 B1 * | 7/2001 | Surprenant et al. | .......... | 370/458 |
| 6,330,321 B2 * | 12/2001 | Detampel et al. | ...... | 379/205.01 |
| 6,496,201 B1 * | 12/2002 | Baldwin et al. | ............. | 715/753 |
| 6,574,469 B1 | 6/2003 | Xiang et al. | | |
| 6,615,239 B1 * | 9/2003 | Berstis | ....................... | 709/204 |

(Continued)

OTHER PUBLICATIONS

Paxton J. Smith, et al., Tandem-Free VoIP Conferencing: A Bridge to Next-Generation Networks, IEEE Communications Magazine May 2003, pp. 136-145.

(Continued)

*Primary Examiner*—Kamal B Divecha
*Assistant Examiner*—Saket K Daftuar
(74) *Attorney, Agent, or Firm*—Dillon & Yudell LLP

(57) ABSTRACT

A method and system for coordinating a Voice Over Internet Protocol (VoIP) teleconference. A teleconference operator drags the name of invited attendees into a hot window, which connects the invited attendees to a channel for the teleconference. Each invited attendee's name has a status icon associated with it, indicating if the invited attendee is active in the teleconference. Each invited attendee has access to a Graphical User Interface (GUI) that permits the attendee to toggle back and forth between different teleconferences.

22 Claims, 10 Drawing Sheets

U.S. PATENT DOCUMENTS

| | | | |
|---|---|---|---|
| 6,925,065 B1* | 8/2005 | Roy | 370/260 |
| 7,043,528 B2* | 5/2006 | Schmitt et al. | 709/204 |
| 7,152,093 B2* | 12/2006 | Ludwig et al. | 709/204 |
| 7,185,054 B1* | 2/2007 | Ludwig et al. | 709/204 |
| 7,206,809 B2* | 4/2007 | Ludwig et al. | 709/204 |
| 7,213,051 B2* | 5/2007 | Zhu et al. | 709/205 |
| 7,230,639 B2* | 6/2007 | Ferren et al. | 348/14.08 |
| 7,328,264 B2* | 2/2008 | Babka | 709/226 |
| 7,761,505 B2* | 7/2010 | Krzyzanowski et al. | 709/204 |
| 2002/0054104 A1* | 5/2002 | Berczik et al. | 345/764 |
| 2003/0156603 A1* | 8/2003 | Rakib et al. | 370/485 |
| 2004/0039794 A1* | 2/2004 | Biby et al. | 709/217 |
| 2004/0098456 A1* | 5/2004 | Krzyzanowski et al. | 709/204 |
| 2004/0107255 A1* | 6/2004 | Ludwig et al. | 709/204 |
| 2004/0114746 A1* | 6/2004 | Caspi et al. | 379/202.01 |
| 2006/0010392 A1* | 1/2006 | Noel et al. | 715/759 |
| 2006/0098085 A1* | 5/2006 | Nichols et al. | 348/14.07 |
| 2006/0098798 A1* | 5/2006 | Krasnansky | 379/202.01 |

OTHER PUBLICATIONS

David Colemen and Lewis Ward, Taking Advantage of Real-Time Collaboration Tools, IT Pro, Jul./Aug. 1999 pp. 25-30.

Anna Hac and Dongchen Lu, Architecture, Design and Implementation of a Multimedia Conference System, Int. J. Network Mgmt., vol. 7, 1997, pp. 64-83.

Jiann-Min Ho, Jia-Cheng Hu, and Peter Steenkiste, A Conference Gateway Supporting Interoperability Between SIP and H.323, MM'01 Sep. 30-Oct. 5, 2001, Ottawa, Canada pp. 421-430.

* cited by examiner

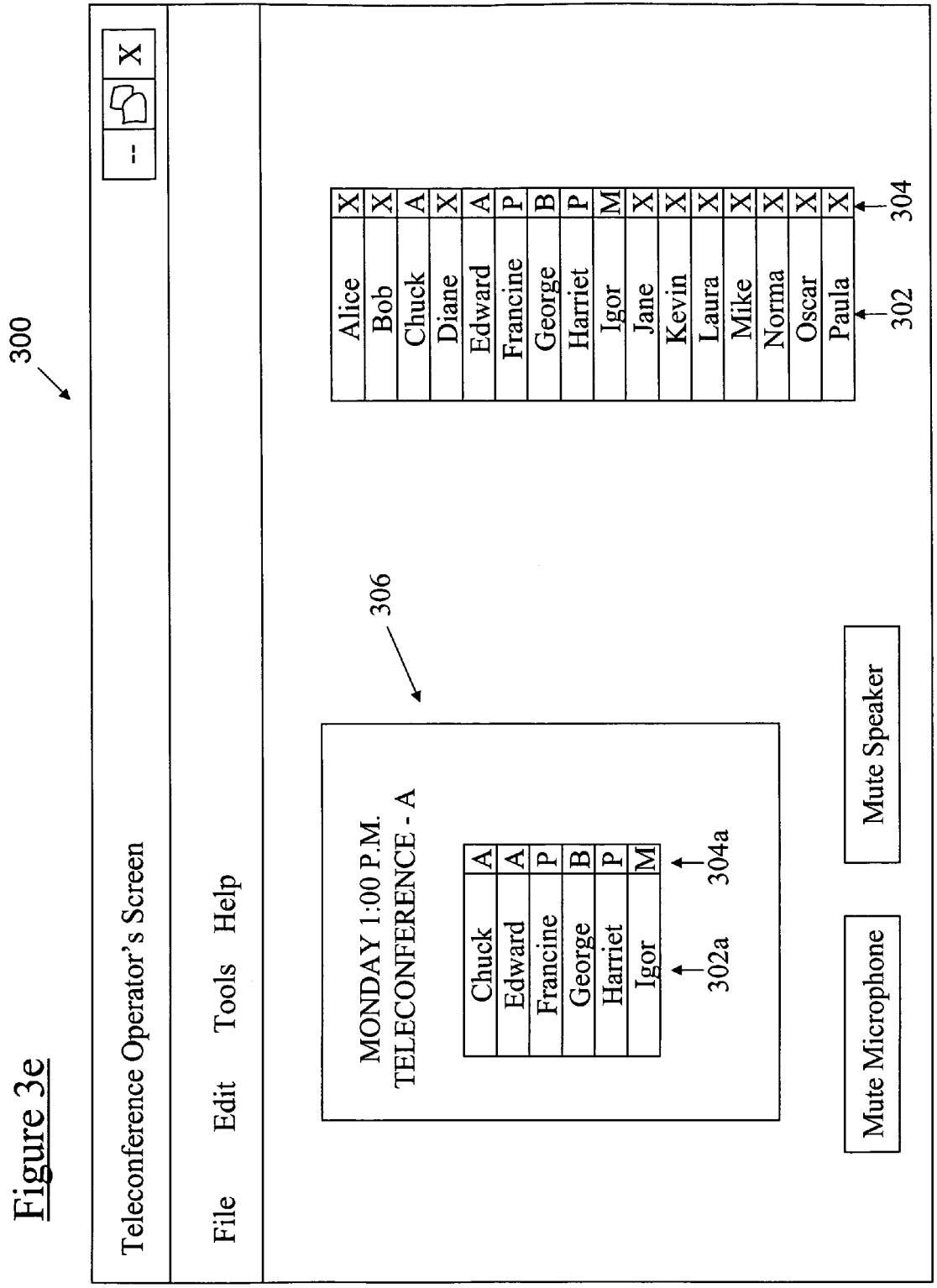

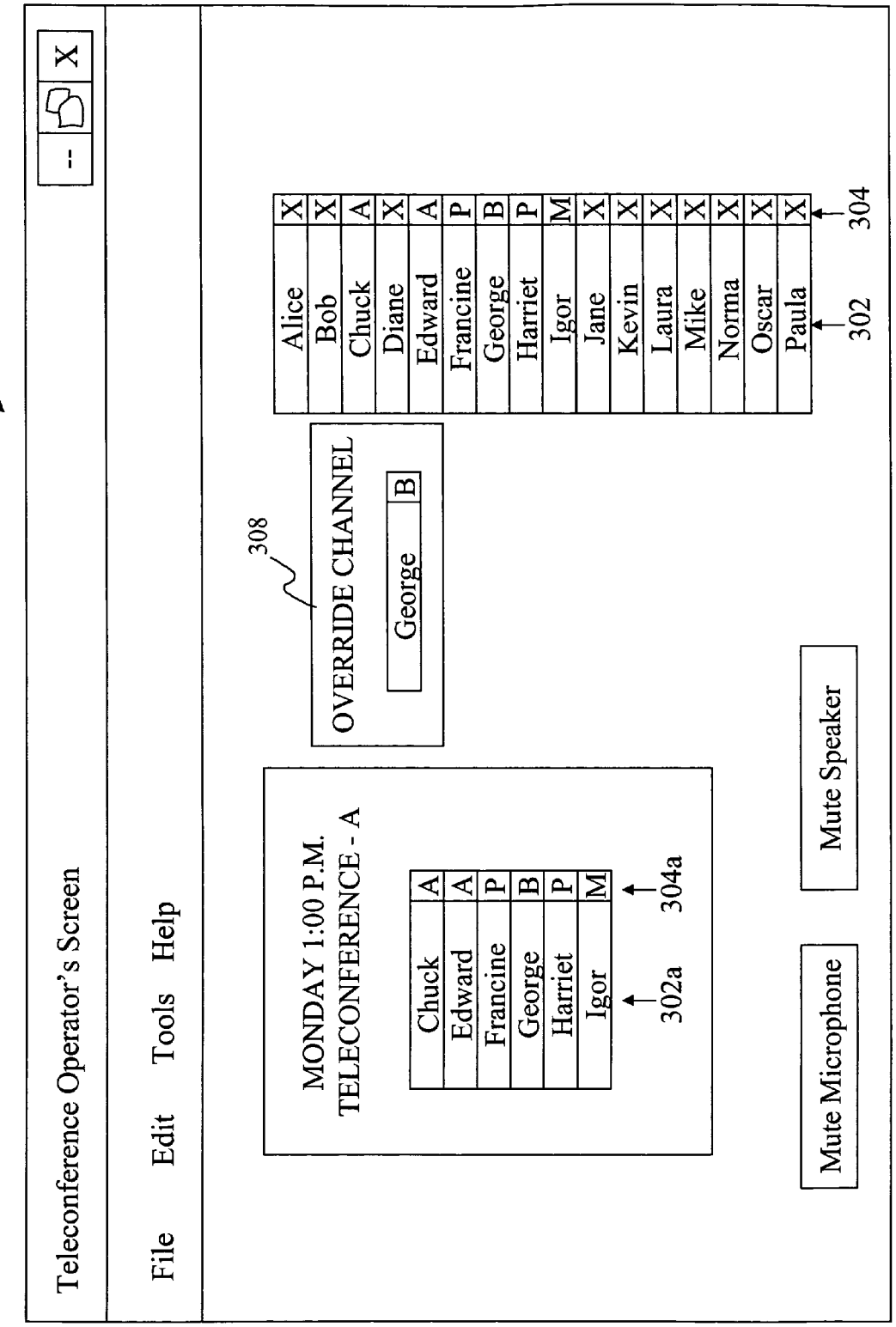

INTEGRATED VOICE AND VIDEO CONFERENCING MANAGEMENT

BACKGROUND OF THE INVENTION

1. Technical Field

The present invention relates in general to the field of computers, and in particular to the use of computers for teleconferencing. Still more particularly, the present invention relates to a method and system for coordinating the status of attendees of a teleconference meeting.

2. Description of the Related Art

While modern computers have a wide variety of uses, one that is becoming more popular and more sophisticated is the use of a computer for teleconferencing. Such teleconferencing utilizes one or more computers connected to a network, usually a Local Area Network (LAN), through which users can communicate. With the expanded use of Wide Area Networks (WANs), including the Internet, such teleconferences can also be held by users that are physically located in remote locations, including different countries.

A popular form of teleconferencing uses a "chat room." Such chat rooms are typically browser based and comport with rules and conventions specified by the Internet Relay Chat (IRC), published by the Network Working Group, and identified as Request For Comments (RFC) 1459, May 1993, et seq.

A single teleconference is by definition limited to a single channel. Per RFC 1459, section 1.3, a channel is a named group of one or more clients which all receive messages addressed to that channel. Typically, a channel is under the control of an operator, who has control over who may be in the channel. A user may be part of several channels (and thus several teleconferences) at once, thus making coordination and control of who is and is not authorized to be in a channel problematic.

What is needed, therefore, is a method and system that permits a teleconference operator to easily see what users are allowed to participate in a teleconference, to easily insert and remove users from the teleconference, and to easily see the participation status of all users authorized to participate in the teleconference.

SUMMARY OF THE INVENTION

The present invention is thus directed to a method and system for coordinating a Voice Over Internet Protocol (VoIP) teleconference. A teleconference operator drags the names of invited attendees into a hot window, which connects the invited attendees to a channel for the teleconference. Each invited attendee's name has a status icon associated with it, indicating if the invited attendee is active in the teleconference. Each invited attendee has access to a Graphical User Interface (GUI) that permits the attendee to toggle back and forth between different teleconferences.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 3a-f depict exemplary Graphical User Interfaces (GUIs) seen by the operator (manager) of the teleconference;

DETAILED DESCRIPTION OF THE PREFERRED EMBODIMENT

Figure 1:
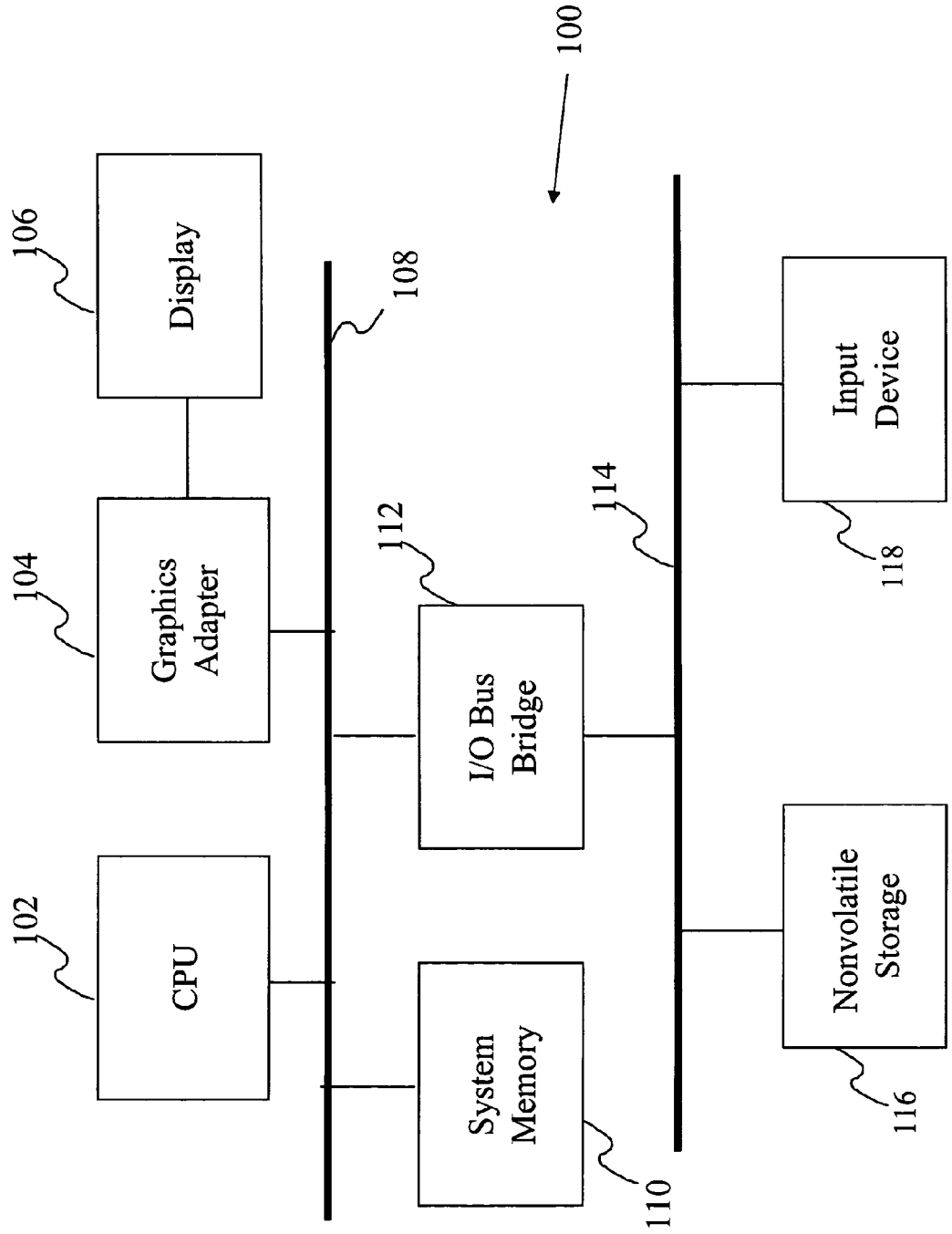
FIG. 1 depicts an exemplary computer system in which a teleconference according to the present invention may be implemented.

With reference now to the figures and, in particular to FIG. 1, there is depicted a block diagram of a data processing system in which a preferred embodiment of the present invention may be implemented. Data processing system 100 may be, for example, one of the models of personal computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention.

A first computer system such as shown as data processing system 100 is used by an operator (manager) of a teleconference, and second computer system, also incorporating the exemplar features described for data processing system 100, is used by an attendee (client) of the teleconference.

Figure 2:
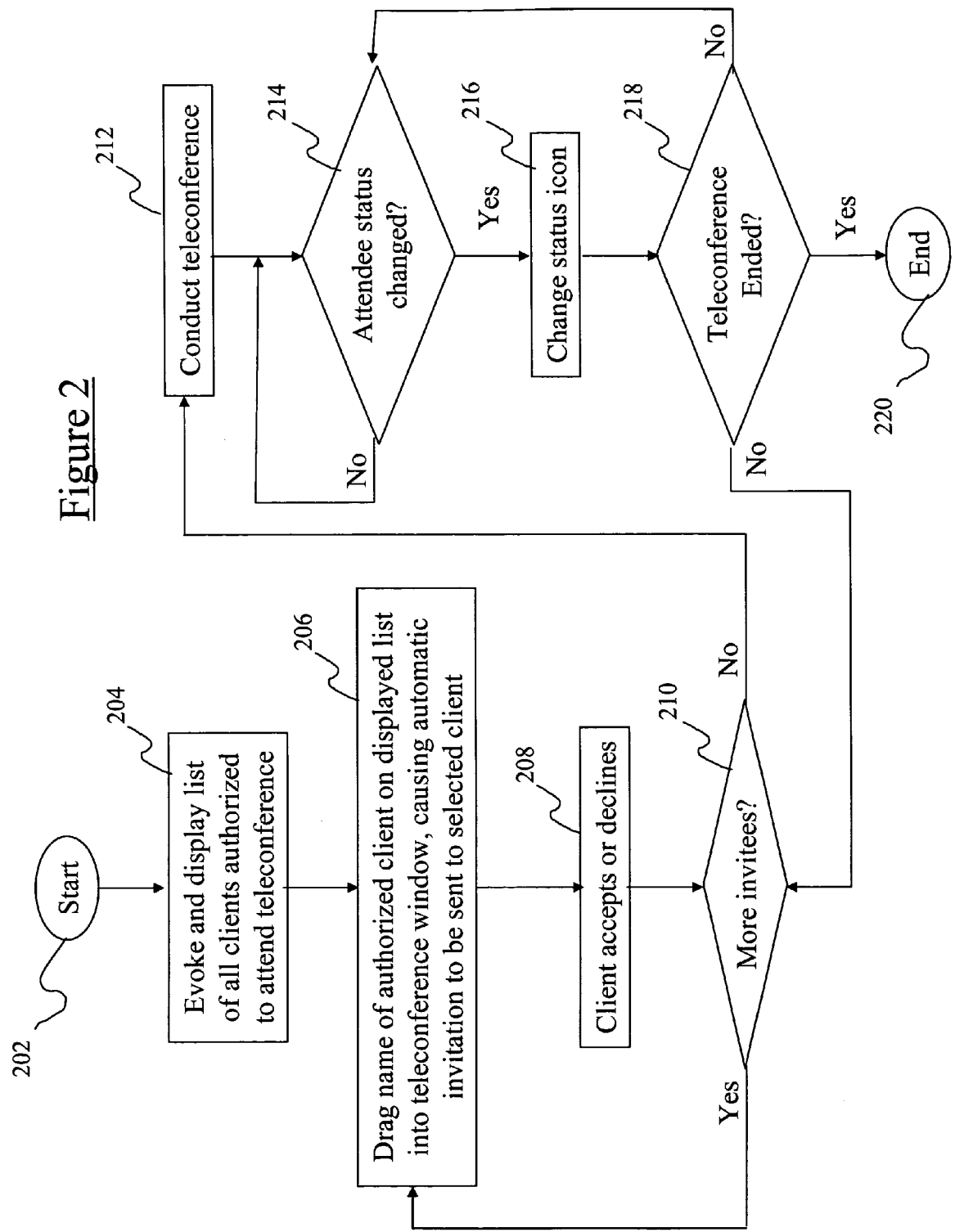
FIG. 2 is a flow chart of steps taken to include and manage invitees to a teleconference in accordance with the present invention.

With reference now to FIG. 2, a flow chart describes exemplary steps taken to manage a teleconference in accordance with the present invention. In a preferred embodiment of the present invention, the teleconference includes transmission and display of audio, video, text and shared data files. After initiator block 202, an operator evokes and displays a list of all clients who are authorized to attend a teleconference. Additional details and examples of such a list are shown in FIGS. 3a-f. This list of clients may be universal (for any and all teleconferences hosted by the operator), or the list may be specific for clients authorized to participate in a particular class of teleconferences (restricted by technical content, security clearances, geographic regions, et al.), or the list may be specific for one and only one teleconference defined by the authorized clients and/or a time/date for the teleconference.

Once the list of authorized clients has been displayed, then the name of each client to be invited to a teleconference is "drag and dropped" by the operator into an active window for a specific teleconference (block 206). By dropping the client's name into the active window, an invitation (preferably via a pop-up window or alternatively via an e-mail) is sent to the named client to join in the teleconference. Preferably, the invitation includes information such as a passcode to join the teleconference, the subject matter of the teleconference, the names of other attendees, and other like information. In a preferred embodiment of the invention, this invitation is given at the same time that the teleconference is to be held. That is, rather than asking the client to calendar the teleconference for a future "call in," the invitation allows the client to immediately join the teleconference.

At block 208, the client either accepts or declines the invitation. The time to accept may be limited to any amount of time within the teleconference. That is, the time to accept may be limited to a fixed amount of time from when the invitation was received (e.g., five minutes), a fixed time of day (e.g., between 1:00 and 1:15 p.m. EST), or the time period during which the teleconference is actually in session.

As soon as the operator has invited the desired clients (query block 210), the teleconference begins (block 212). During the teleconference, the status of the attendees is monitored for changes (query block 214). That is, if an attendee drops out of the teleconference, or mutes out, or switches out to another teleconference, then the status icon next to that attendee is changed accordingly (block 216). As long as the teleconference is in session (query block 218), new attendees can be added by the operator, and the status icon for those attendees is continually updated until the teleconference ends (terminator block 220).

Figure 3A:
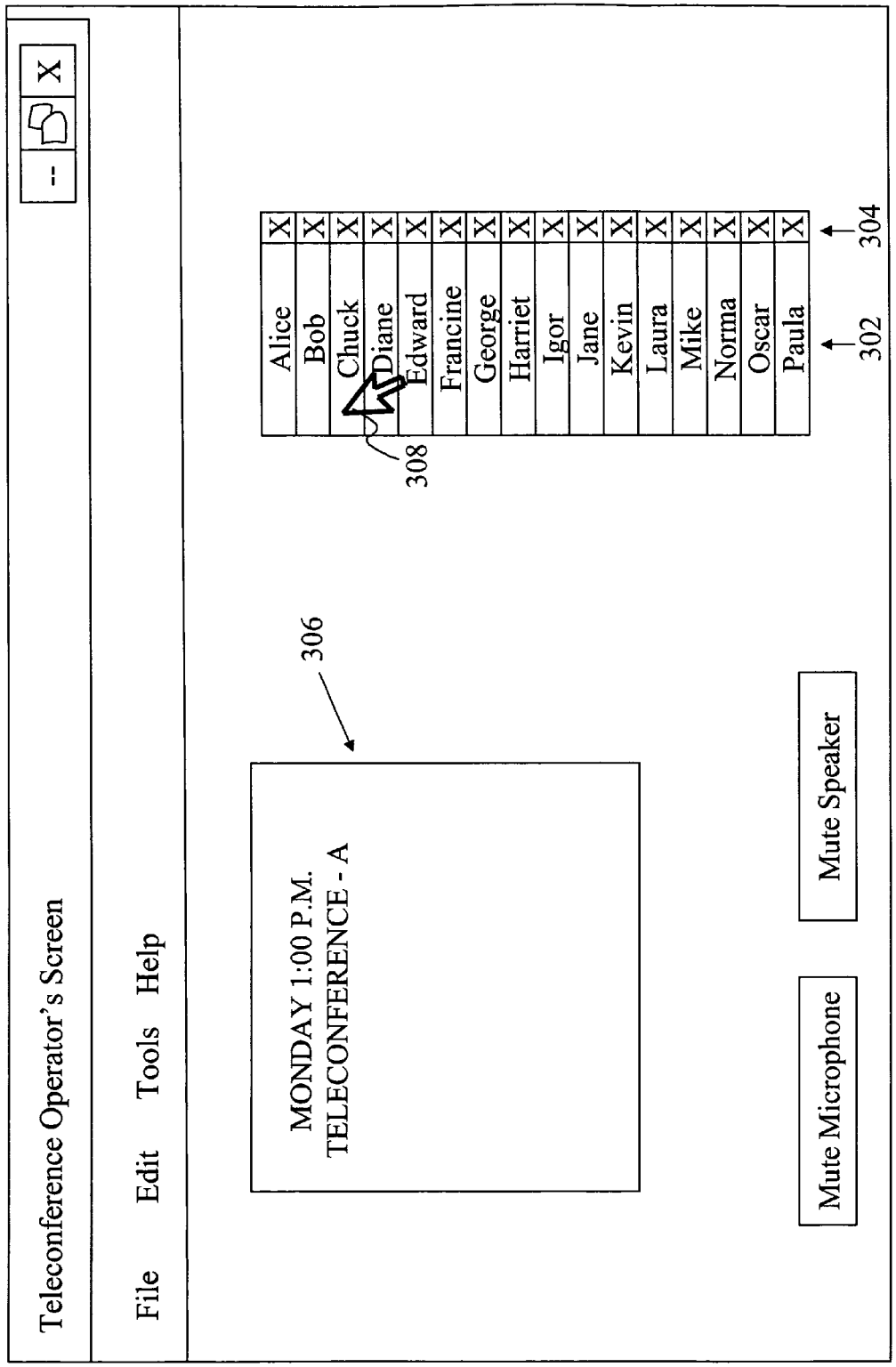

Referring now to FIG. 3a, a Graphical User Interface (GUI) 300 is depicted for a screen used by the teleconference operator (manager; controller). A client list 302 shows all persons who are authorized to participate in a teleconference hosted by the operator. This authorization may be unlimited (any person on client list 302 may participate in any teleconference hosted by the operator), or may be limited to a particular teleconference or class of teleconference (the class defined by the topic of the teleconference, authorized participants, geographic region of participants, et al.). Next to each client listed in client list 302 is a status icon 304. In FIG. 3a, each status icon 304 is depicted as an "X", indicating that all clients listed have not been invited to a teleconference, such as Teleconference-A being held on Monday at 1:00 P.M. To invite any or all of the clients listed in client list 302, the teleconference operator preferably "drags and drops" the person's name, using a pointing cursor 308, into an active window 306.

Figure 3B:
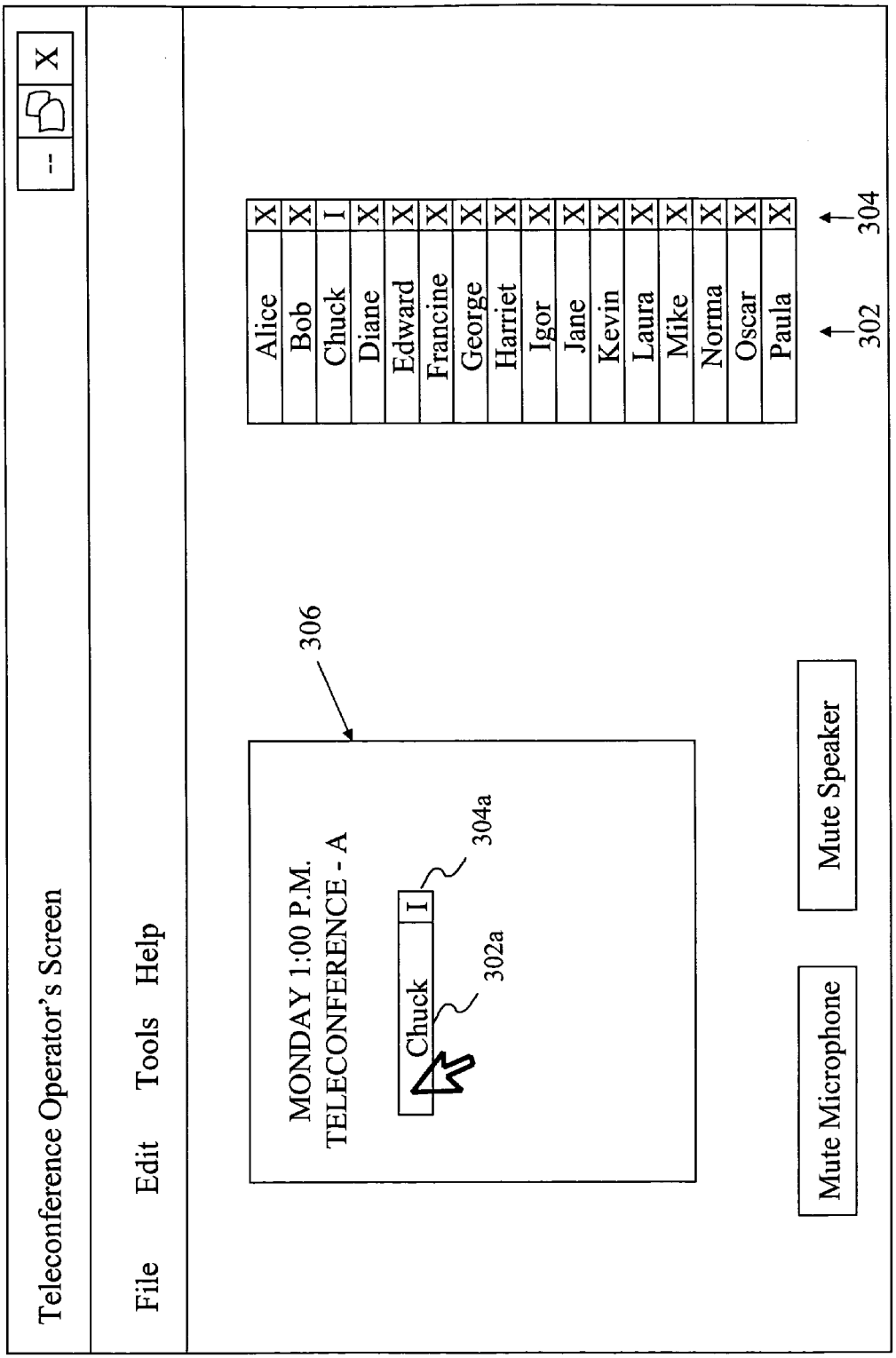
Figure 3C:
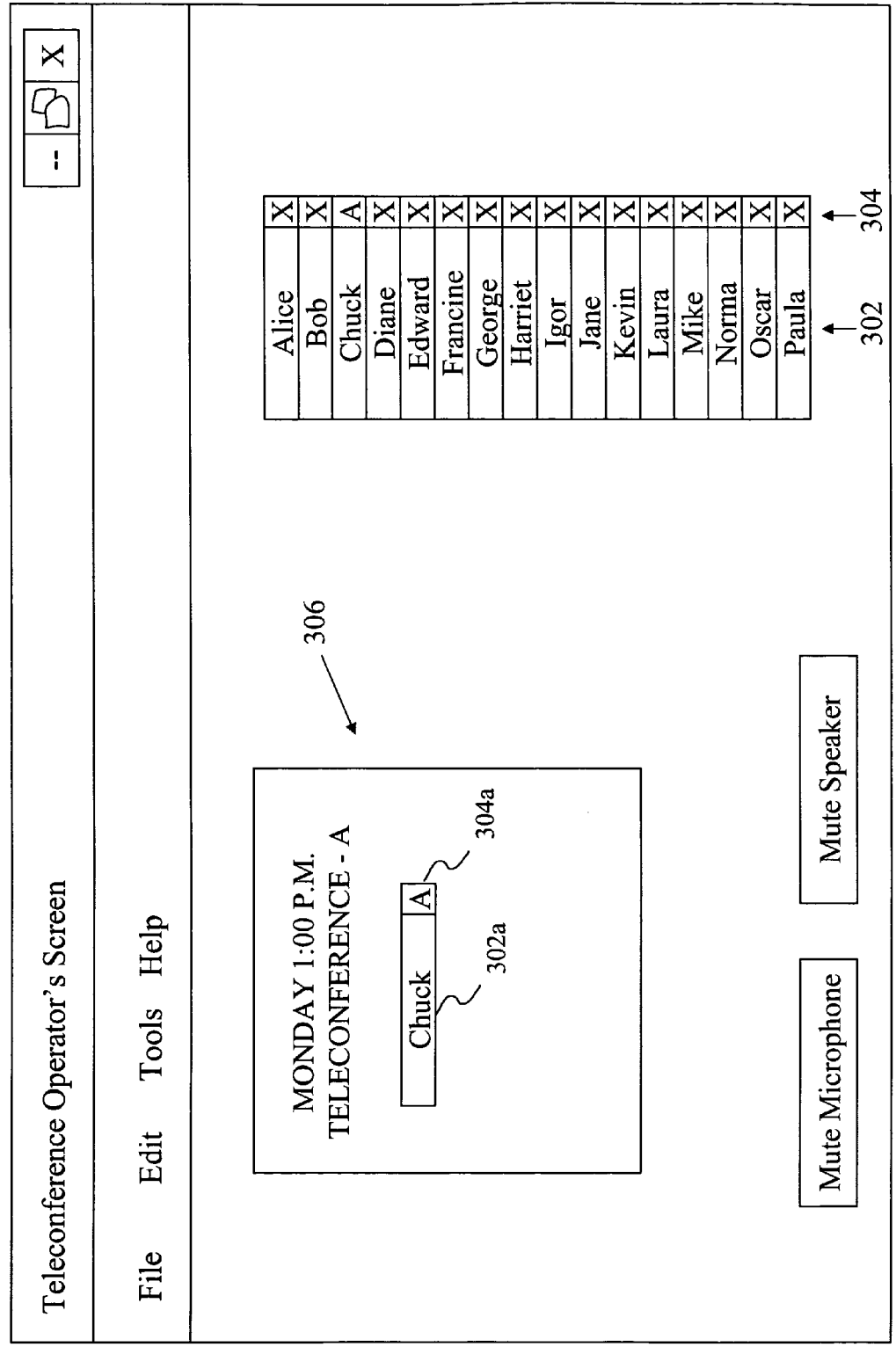

As shown in FIG. 3b, once the client's name (identified as "Chuck" in 302a) has been dragged into active window 306, that client's status icon 304a changes from "X" for "not invited" to "I" for "invited." As shown in FIG. 3c, when the client named "Chuck" accepts the invitation (to immediately join the teleconference), then the status icon 304a changes to "A" for "accepted." Note that any change to the status icon is shown both in the original listing of status icons 304 as well as the copy of the status icon that accompanied the dragged client name.

Figure 3D:
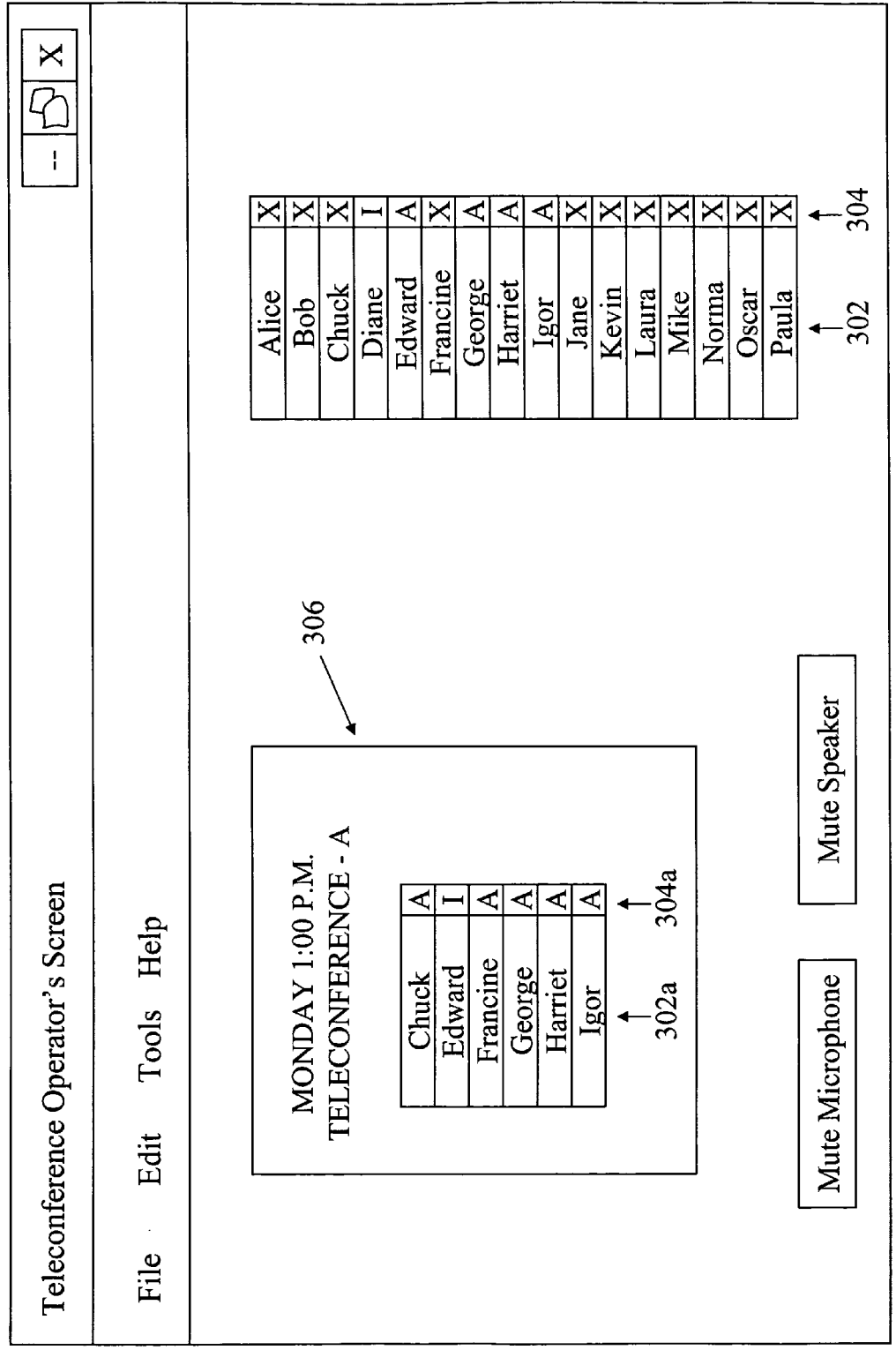

Referring now to FIG. 3d, once the teleconference operator has invited all of the clients desired, they show up in a client list 302a along with accompanying status icons 304a. As shown in FIG. 3d, "Edward" has still not accepted the invitation, while the other invitees have.

With reference to FIG. 3e, other status icons 304 can be used after the teleconference is in session. For example, the status icon 304 associated with "George" is shown as "B" for "busy," indicating that "George" has muted his speaker so that he cannot hear the attendees of Teleconference-A. George may be busy with paperwork or other matters, or he may be involved in another teleconference.

The status icon 304a associated with "Igor" is shown as "M" indicating that Igor has muted his microphone. The status icons 304a associated with "Francine" and "Harriet" are "P" for "private," indicating that they are having a private teleconference with another attendee of the Teleconference-A. In this case, the private teleconference is obviously between Francine and Harriet.

Referring now to FIG. 3f, if the teleconference operator wishes to communicate with George, an alternate channel must be used, since George is busy and has muted out Teleconference-A. Thus, the teleconference operator contacts George via an override channel that is accessible to only the teleconference operator and George. By dragging George's name and status icon into active window 308, software automatically establishes a line of communication, voice and/or text, between the teleconference operator and George via an override channel. George can thus be advised to rejoin the Teleconference-A.

Figure 4:
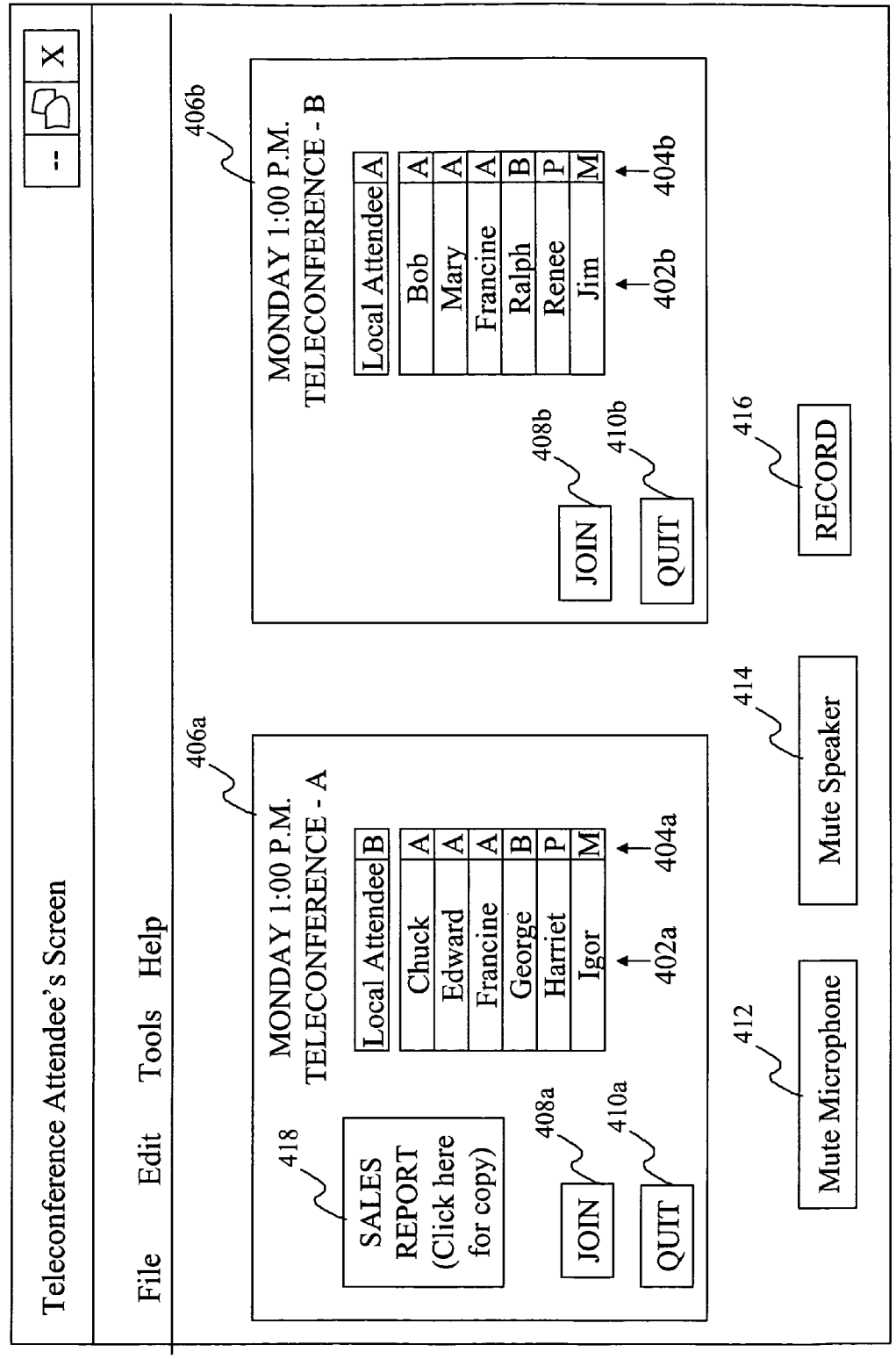
FIG. 4 illustrates an exemplary GUI seen by a client attendee of the teleconference.

With reference now to FIG. 4, a teleconference attendee's GUI 400 is depicted. GUI 400 includes a listing of attendees 402 and their associated status icons 404 for one or more teleconferences. For example, a window 406a may shown the attendees of Teleconference-A, while window 406b shows the attendees of Teleconference-B. By clicking button 408a or 408b, the teleconference attendee can toggle back and forth between the two teleconferences. Clicking button 408 invokes software that connects the attendee to the appropriate channel on which the rest of the attendees to a teleconference are connected. This software also automatically changes the status icon for the local attendee to the appropriate style. For example, if the local attendee was originally participating in Teleconference-A, clicking "Join" button 408b will change her status icon in Teleconference-A to "B" for "busy," and her status icon in Teleconference B will change to "A" for "attending" as depicted.

When the local attendee wishes to quit a particular teleconference, then the appropriate "Quit" button 410 is clicked, thus removing the attendee from the channel on which the teleconference is active.

Note that GUI 400 preferably has other hot buttons as well. For example, by clicking the "Mute Microphone" button 412, then the local microphone is muted, and other teleconference attendees, including the teleconference operator, are unable to hear the local attendee. This will result in the status icon for the local attendee to show up as "M" to the rest of the teleconference attendees in both Teleconference-A and Teleconference-B. Similarly, the local attendee can mute is own speaker by clicking the "Mute Speaker" button 414, resulting in her status icon showing as a "B."

If at any time the local attendee wishes to record (video, audio or text) a teleconference, she can click the "Record" button 416, and such recordation will immediately begin. Such recordation preferably occurs at the local computer used by the attendee, or may occur remotely on a server, the operator's computer, or any other similar device.

Likewise, the local attendee may be offered a copy of a file, such as offered by an attendee of the operator of Teleconference-A. By clicking the "Sales Report" button 418, a copy of the text file titled "Sales Report" will be sent to the local attendee.

While the status icons have been shown as letter inside boxes next to the name of an attendee/client, in a preferred embodiment the status icons are color coded. For example, a status icon for "attending" could be green, while the status icon for "muted" could be yellow, and the status icon for "busy" could be red.

The present invention preferably utilizes Voice Over Internet Protocol (VoIP), in compliance with the H.323 suite of standards promulgated by the International Telecommunications Union (ITU), which standards are incorporated by reference herein in their entirety. Note that the H.323 standard for VoIP defines and describes software components of VoIP as being only the top four layers (Application, Presentation, Session and Transport) of the Open Systems Interconnection (OSI) Standard promulgated by the International Organization of Standardization (IOS). The OSI Standard is incorporated by reference herein in its entirety.

Figure 5:
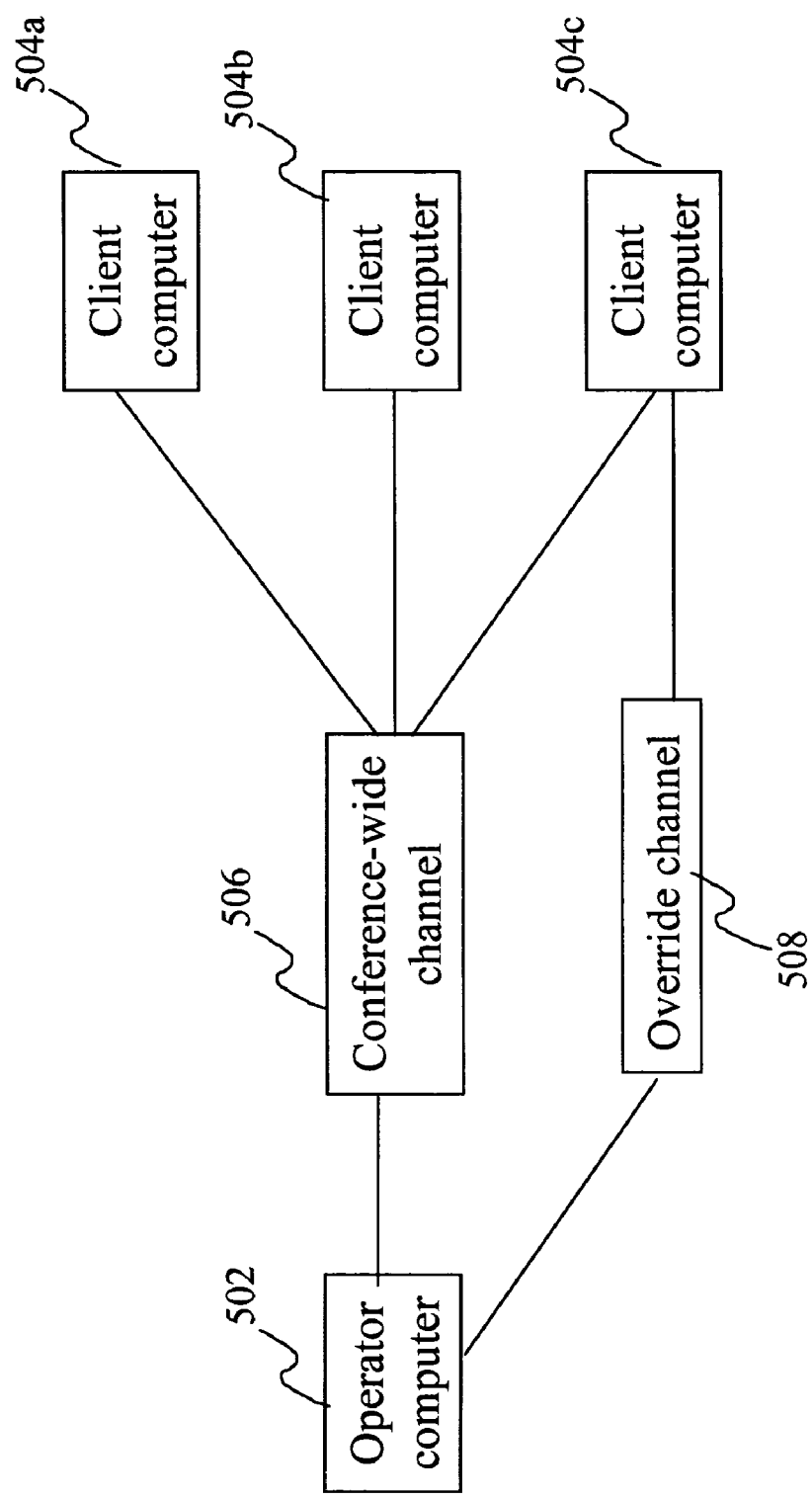
FIG. 5 is a block diagram of means for implementing the present invention.

With reference now to FIG. 5, there is depicted a block diagram of means for enacting the present invention. An operator computer 502 and client computers 504 preferably incorporate the features described in FIG. 1 for data processing system 100. Operator computer 502 includes the means for selecting and notifying attendees for a teleconference on a conference-wide channel 506. Operator computer 502 also includes the means for detecting and indicating which of the attendees have called in to the teleconference, and for establishing a private teleconference between operator computer 502 and client computer 504c via an override channel 508 that is accessible to only operator computer 502 and client computer 504c, as described in FIG. 3f. In a preferred embodiment, client computers 504 includes means for toggling between different teleconferences, as described in FIG. 4, as well as muting a local speaker and/or microphone, recording a teleconference, and receiving a file associated with a file icon. Other features described and claimed in the present application are distributed in their implementation among the components shown in FIG. 5.

It should be understood that at least some aspects of the present invention may alternatively be implemented in a program product. Programs defining functions of the present invention can be delivered to a data storage system or a computer system via a variety of media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such media when carrying or encoding computer readable instructions that direct method functions of the present invention represent alternative embodiments of the present invention. Further, it is understood that the present invention may be implemented by a system having means in the form of hardware, software, or a combination of software and hardware, as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method to implement a teleconference, comprising:
   displaying on an administrator computer a teleconferencing application which displays a client list including client's names and respective status icons showing a list of all persons authorized to attend and participate in one or more teleconferences hosted by a teleconference administrator of the administrator computer, wherein the status icons indicates a respective persons' status corresponding to the one or more teleconferences;
   selecting, from the client list displayed on the teleconferencing application, potential attendees in regard to first teleconference being held on a first conference-wide multi-media channel communicatively connected to a respective client computer for each of said selected potential attendees and notifying by the teleconference administrator using the administrator computer, said potential attendees in regard to the first teleconference being held on a first conference-wide multi-media channel communicatively connected to a respective client computer for each of said selected potential attendees, wherein the first teleconference is conducted via the administrator computer and the respective client computers of conference attendees, and wherein the teleconference provides transmission and display of multimedia content comprising audio, video, text and shared data files;
   detecting and indicating on said teleconferencing application on the administrator computer which of said selected potential attendees has joined and become an attendee of said first teleconference such that each of said respective client computers of attendees of said first teleconference are communicatively connected to each other via said first conference-wide multi-media channel and to said administrator computer; and
   placing a second teleconference on a second conference-wide multi-media channel by said teleconference administrator using the teleconferencing application on said administrator computer such that said second conference-wide multi-media channel, which is a separate communication channel from the first conference-wide multi-media channel, is communicatively connected to said administrator computer and to at least a plurality of said client computers of attendees of said first teleconference and allows each of said attendees of said first teleconference who have access to said second conference-wide multi-media channel to become an attendee of said second teleconference and to communicate with other attendees of said second teleconference and with said administrator computer and be able to switch between being an attendee of said first teleconference and an attendee of said second teleconference using their respective client computer;
   wherein a potential attendee of at least one of said first teleconference and said second teleconference is selected to be an attendee of said first teleconference or second teleconference by said teleconference administrator dragging and dropping, into an active window displayed on said teleconferencing application of said administrator computer for said respective first teleconference or second teleconference, a client name from the client's names in the client list displayed on said teleconferencing application on the administrator computer and representing said potential attendee that is not attending said respective first teleconference or second, wherein said active window includes icons representing all attendees of said respective first teleconference or second teleconference;
   wherein said dragging and dropping of said client name into said active window by said teleconference administrator automatically generates said notifying and displays a popup invitation based on the notifying on said respective client computer of said selected potential attendee who has not joined said respective first teleconference or second teleconference to accept said invitation to said respective first teleconference or second teleconference and to loin said respective first teleconference or second teleconference, wherein the popup invitation includes information which enables the client to immediately join the teleconference.

2. The method to implement a teleconference of claim 1, further comprising:
accepting a file icon by said attendees displayed on the respective client computer of the attendees for said first or second teleconference to share contents of a file associated with said file icon among attendees accepting said file icon who are participating in the same first or second teleconference for which the file icon is displayed.

3. The method to implement a teleconference of claim 2, further comprising:
recording spoken content during said first or second teleconference by at least one of said attendees of said first or second teleconference using the respective client computer of the at least one of said attendees.

4. The method to implement a teleconference of claim 1, further comprising:
contacting an attendee of said first or second teleconference by said teleconference administrator using said administrator computer via an override channel that is accessible to only said teleconference administrator and an attendee of said first or second teleconference that has muted said first or second teleconference on said attendee's respective client computer, such that said teleconference administrator initiates said contacting of said attendee using said administrator computer and said teleconference administrator is able to override a local mute button activated by said muted attendee to communicate exclusively with said muted attendee via said override channel, which is a third communication channel separate from the first and second conference-wide multi-media channel.

5. The method to implement a teleconference of claim 1, further comprising:
displaying a respective status icon, on a display connected to said administrator computer, for each of said selected potential attendees that have joined said first or second teleconference as well as potential attendees of said first or second teleconference that have been invited to join but have not joined said first or second teleconference, such that said respective status icon indicates for each said selected potential attendee an indication that said selected potential attendee is:
attending and in two-way communication in said first or second teleconference,
attending said first or second teleconference and having a local microphone muted on said attendee's respective client computer,
attending said first or second teleconference and having incoming audio from said first or second teleconference muted on said attendee's respective client computer, or
not joined to at least one of said first teleconference and said second teleconference.

6. The method to implement a teleconference of claim 5, further comprising:
displaying a status icon indicating that an attendee of said first or second teleconference is attending a private communication.

7. The method to implement a teleconference of claim 6, wherein said private communication is with another attendee of said respective first or second teleconference.

8. The method to implement a teleconference of claim 5, wherein said respective status icon is color coded.

9. The method to implement a teleconference of claim 1, wherein at least one of said first teleconference and said second teleconference is conducted using Voice Over Internet Protocol (VoIP) communication.

10. The method to implement a teleconference of claim 1, further comprising:
displaying a file icon displayed on said client computer of an attendee of said first or second teleconference, wherein selecting said file icon by said attendee using said respective client computer of said attendee creates a local copy of a file associated with said file icon on said respective client computer of said attendee.

11. The method to implement a teleconference of claim 1, further comprising:
audio recording said first or second teleconference by an attendee of said respective first or second teleconference.

12. A computer program product comprising a non-transitory computer readable storage media having encoded thereon computer instructions that when executed by a computer perform a method of implementing a teleconference system, comprising:
displaying on an administrator computer a teleconferencing application which displays a client list including client's names and respective status icons showing a list of all persons authorized to attend and participate in one or more teleconferences hosted by a teleconference administrator of the administrator computer, wherein the status icons indicates a respective persons' status corresponding to the one or more teleconferences;
selecting, from the client list displayed on the teleconferencing application, potential attendees in regard to first teleconference being held on a first conference-wide multi-media channel communicatively connected to a respective client computer for each of said selected potential attendees and notifying by the teleconference administrator using the administrator computer, said potential attendees in regard to the first teleconference being held on a first conference-wide multi-media channel communicatively connected to a respective client computer for each of said selected potential attendees, wherein the first teleconference is conducted via the administrator computer and the respective client computers of conference attendees, and wherein the teleconference provides transmission and display of multimedia content comprising audio, video, text and shared data files;
detecting and indicating on said teleconferencing application on the administrator computer which of said selected potential attendees has joined and become an attendee of said first teleconference such that each of said respective client computers of attendees of said first teleconference are communicatively connected to each other via said first conference-wide multi-media channel and to said administrator computer; and
placing a second teleconference on a second conference-wide multi-media channel by said teleconference administrator using the teleconferencing application on said administrator computer such that said second conference-wide multi-media channel, which is a separate communication channel from the first conference-wide multi-media channel, is communicatively connected to said administrator computer and to at least a plurality of said client computers of attendees of said first teleconference and allows each of said attendees of said first teleconference who have access to said second conference-wide multi-media channel to become an attendee of said second teleconference and to communicate with other attendees of said second teleconference and with said administrator computer and be able to switch between being an attendee of said first teleconference and an attendee of said second teleconference using their respective client computer;

wherein a potential attendee of at least one of said first teleconference and said second teleconference is selected to be an attendee of said first teleconference or second teleconference by said teleconference administrator dragging and dropping, into an active window displayed on said teleconferencing application of said administrator computer for said respective first teleconference or second teleconference, a client name from the client's names in the client list displayed on said teleconferencing application on the administrator computer and representing said potential attendee that is not attending said respective first teleconference or second, wherein said active window includes icons representing all attendees of said respective first teleconference or second teleconference;

wherein said dragging and dropping of said client name into said active window by said teleconference administrator automatically generates said notifying and displays a popup invitation based on the notifying on said respective client computer of said selected potential attendee who has not joined said respective first teleconference or second teleconference to accept said invitation to said respective first teleconference or second teleconference and to join said respective first teleconference or second teleconference, wherein the popup invitation includes information which enables the client to immediately join the teleconference.

13. The computer program product of claim 12, the method further comprising:

displaying on each of said respective client computer of said attendees of said first or second teleconference a file icon associated with one of said first teleconference and said second teleconference to be accepted by said attendee of said respective first or second teleconference to share contents of a file associated with said displayed file icon between attendees of said respective first or second teleconference for which said file icon is displayed.

14. The computer program product of claim 13, wherein spoken content for said first or second teleconference is recorded by an attendee of said respective first or second teleconference on said respective client computer of said attendee of said respective first or second teleconference.

15. The computer program product of claim 12, wherein an attendee of said first or second teleconference is contacted by said teleconference administrator using said administrator computer via an override channel that is accessible to only said teleconference administrator and said attendee of said first or second teleconference that has muted said first or second teleconference on said conference-wide multi-media channel on said respective client computer of said attendee of said first or second teleconference, such that said override channel allows said teleconference administrator to initiate said contacting of said attendee of said first or second teleconference using said administrator computer and to override a local mute button activated by said muted attendee and to communicate exclusively with said muted attendee of said first or second teleconference via said override channel.

16. The computer program product of claim 12, wherein a display connected to said administrator computer displays a respective status icon for each of said selected potential attendees of said first or second teleconference such that said selected potential attendees include selected potential attendees that have joined said first or second teleconference as well as selected potential attendees that have been invited to attend but have not joined said first or second teleconference, such that said respective status icon indicates that each respective selected potential attendee is:

attending and in two-way communication in said first or second teleconference, attending said first or second teleconference and having a local microphone muted on said respective client computer, attending said first or second teleconference and having incoming audio from said first or second teleconference muted on said respective client computer, or not attending at least one of said first teleconference and said second teleconference.

17. The computer program product of claim 16, wherein said administrator computer display displays a status icon indicating that an attendee of said first or second teleconference is attending a private communication.

18. The computer program product of claim 17, wherein said private communication is with another attendee of said respective first or second teleconference.

19. The computer program product of claim 18, wherein said respective status icon is color coded.

20. The computer program product of claim 12, wherein at least one of said first teleconference and said second teleconference is conducted using Voice Over Internet Protocol (VoIP) communication.

21. The computer program product of claim 12, wherein, a file icon is displayed on a respective client computer of an attendee of said first or second teleconference, and wherein selecting said file icon by said attendee of said respective first or second teleconference using said respective client computer of said attendee creates a local copy of a file associated with said file icon for said attendee.

22. The computer program product of claim 12, wherein, an audio recording of any portion of said first or second teleconference is made by an attendee of said respective first or second teleconference using said respective client computer of said attendee.

\* \* \* \* \*